United States Patent

Gleason

[15] 3,673,769
[45] July 4, 1972

[54] GAS SCRUBBER
[72] Inventor: Thomas G. Gleason, Manhasset, N.Y.
[73] Assignee: Combustion Equipment Associates, Inc., New York, N.Y.
[22] Filed: July 17, 1970
[21] Appl. No.: 55,711

[52] U.S. Cl.................................55/223, 55/236, 55/237
[51] Int. Cl.....................................................B01d 47/00
[58] Field of Search....................55/235, 237, 238, 239, 223

[56] References Cited

UNITED STATES PATENTS 1,461,174  7/1923  Bennett ..................................55/237
2,200,891  5/1940  Nyborg ..................................55/223

FOREIGN PATENTS OR APPLICATIONS 532,120  8/1955  Italy........................................55/223

Primary Examiner—Robert L. Lindsay, Jr.
Attorney—Blum, Moscovitz, Friedman & Kaplan

[57] ABSTRACT

A gas scrubber in which the entering gas is driven through a turbulent bed of water and impinges on a submerged baffle to aspirate the gas and water upwardly through slots which impart a cyclonic flow to the water-entrained gas to effect a spinout of the solids which collect in the surge tank and the cleansed gas is discharged. The need for the usual pump for re-cycling water to provide scrubbing action is eliminated.

7 Claims, 2 Drawing Figures

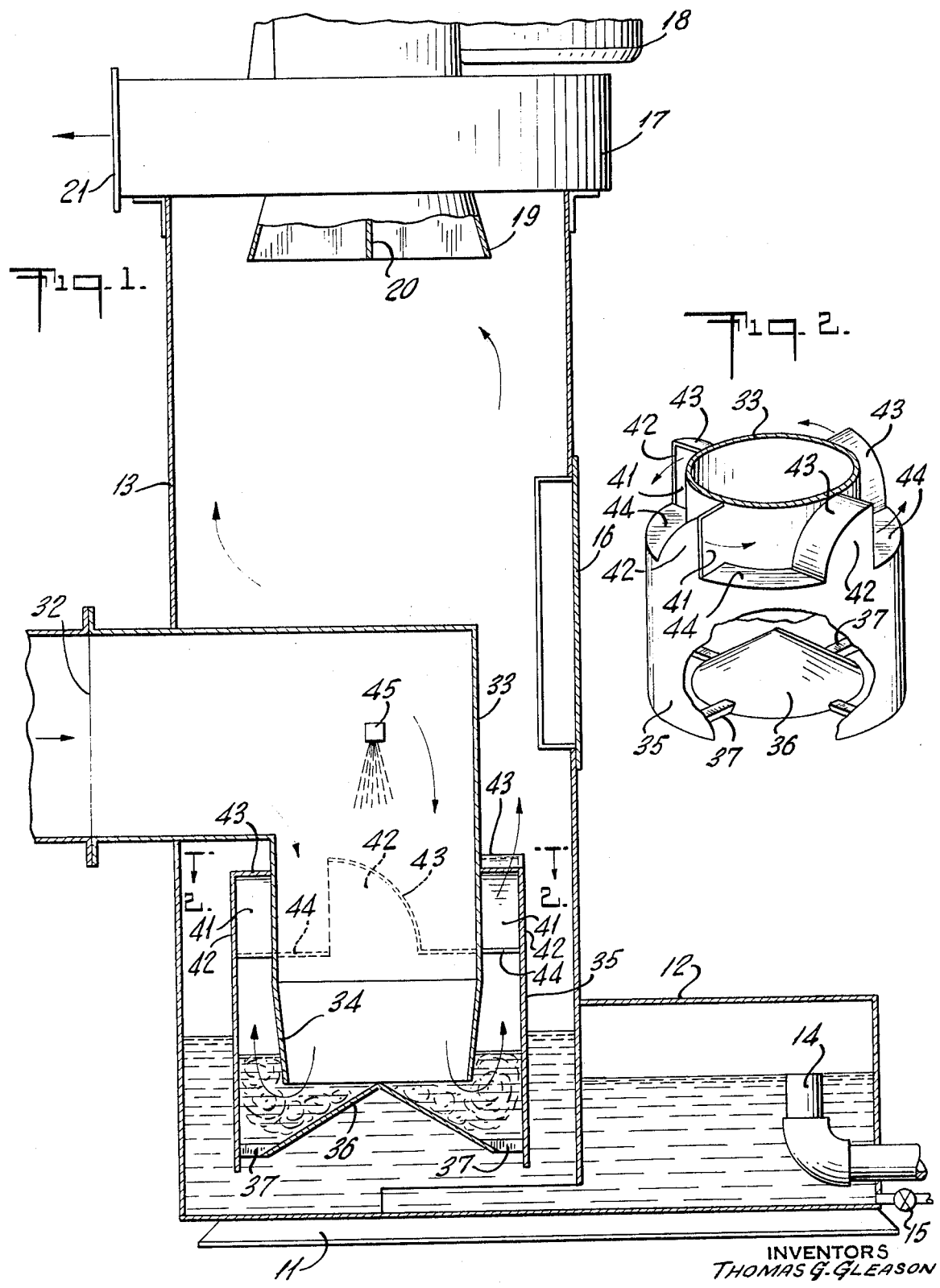

3,673,769

GAS SCRUBBER

BACKGROUND OF THE INVENTION

This invention relates generally to a gas scrubber of improved design. Gas scrubbers are well known in the art and have been used universally for cleaning gas before it is discharged to the atmosphere. It is known that discharged gases entrain noxious, harmful and polluting substances and a wide variety of gas scrubbers have been developed for "-washing" gases before the gases are discharged to the atmosphere.

In metropolitan areas, apartment buildings commonly are constructed with incinerators to burn the waste materials discarded by the tenants. Most commonly, a chute will be provided into which the tenant may dump wastepaper, garbage and like materials. The chute delivers the wastes to a furnace in the basement where the wastes are burnt and the hot gases generated during the combustion process travel upwardly through a flue carrying with them a variety of solids which then spew forth from the chimney and spread soot over a wide area.

Gas scrubbers capable of washing such gases have been known for some time. However, such scrubbers have been excessively complex or expensive for apartment house installation as they normally have required a pump for recycling water to provide the scrubbing action and a high rate of spray injection for effective washing of the gas.

As a result of the cost and complexity of such scrubbers, gas scrubbers in apartment houses have not been widely used. On the other hand, there is currently taking place in this country a considerable increase in interest in minimizing the pollutants and solid materials continually injected into the atmosphere.

SUMMARY OF THE INVENTION

Generally speaking, in accordance with the invention, a gas scrubber is provided which has a minimum number of moving parts and which can be fabricated and installed with relative ease while requiring minimum maintenance. Such scrubbers are suitable for general purpose use but are especially useful for incinerators and especially incinerators of the type found in apartment houses.

Accordingly, it is an object of this invention to provide a gas scrubber of improved construction.

Another object of the invention is to provide a gas scrubber of improved construction with a minimum number of moving parts.

A further object of the invention is to provide a gas scrubber which eliminates the need for a recycling pump and a high rate of spray injection.

Still another object of the invention is to provide an improved gas scrubber of simplified construction having multiple scrubbing zones for effective removal of entrained solids.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a cross-sectional elevational view of a gas scrubber constructed in accordance with a preferred embodiment of the instant invention; and FIG. 2 is a perspective view, partly in section and partly broken away, looking in the direction of the arrows 2—2 of FIG. 1.

DESCRIPTION OF THE PREFERRED EMBODIMENT

Referring now to the drawing, a base 11 supports a surge tank 12 and a vertical, cylindrical, disengaging section 13. The disengaging section communicates, at its lower end, with surge tank 12. A weir 14 is carried by surge tank 12 with the inlet end of the weir determining the level of water in the surge tank. The outlet end of the weir is connected to a drain (not shown). The surge tank is also provided with a cleanout tap 15 also connected to the drain (not shown) for clean out of the surge tank to remove the collected solids. An access door 16 is carried by the wall of the disengaging section.

An exhaust fan 17 is mounted at the top of the disengaging section and is operated by a motor 18. An anti-spin cone 19 with internal straightening vanes 20 communicates between the disengaging section 13 and exhaust fan 17 and the gas outlet is indicated at 21.

A cylindrical inlet section 31 enters horizontally through the side of disengaging section 13 with the gas inlet being indicated at 32. Inlet section 31 communicates with a cylindrical downflow section 33 with the downflow section terminating as a venturi throat 34. A cylinder 35 defining an upflow zone surrounds downflow section 33 and venturi throat 34 in spaced relation with the downflow section and venturi throat. Cylinder 35 extends from below the connection of the downflow section 33 to the inlet section 31 to a point well below the end of venturi throat 34. A cone-shaped scrubbing baffle 36 is supported on cylinder 35 by means of a plurality of struts 37. The apex of scrubbing baffle 36 is located proximate the outlet end of venturi throat 34 although the apex need not lie in the plane of the outlet end of the venturi throat and can be positioned on either side of such plane.

The major diameter of scrubbing baffle 36 is less than the inside diameter of cylinder 35.

A series of tangentially directed spin slots 41 are formed between the inner wall of cylinder 35 and the outer wall of downflow section 33 as best seen in FIG. 2. The wall of cylinder 35 is formed with a plurality of pie-shaped sections 42 with arcuate plates 43 extending between the pie-shaped sections and the downflow section to form a hood for the spin slots. Plates 44 extend between cylinder 35 and downflow section 33 whereby the sole exit for the gases travelling upwardly between the downflow section and cylinder 35 is the spin slots 41.

A water spray 45 is located in the inlet section or downflow section to provide an initial quench and to provide for makeup water. The water spray is connected to a water supply line (not shown).

The water levels indicated are the levels that may be expected during operation of the scrubber which may now be described. Hot gas with entrained solids enters from the incinerator (not shown) at inlet section 31. The gas is drawn through the scrubber by exhaust fan 17 which can be located as shown or can be remotely located in an exhaust duct. If desired, the fan could also be located on the inlet side of the system.

The incoming gas with entrained solids flows downwardly through the downflow section and is quenched by water spray 45. The gas is accelerated through venturi throat 34 and impinges on scrubbing baffle 36 to drive the gas and entrained solids through the bed of water surrounding the scrubbing baffle. The gas flow creates substantial turbulence in the bed of water. The gas is directed upwardly through the up-flow section defined by cylinder 35, aspirating the water upwardly to improve the scrubbing action. As the gas flows through spin slots 41, a tangential or cyclonic flow is imparted thereto, so that, as the spinning mixture of gas, water and entrained solids travels upwardly through the disengaging section, the water and solids are thrown outwardly to impinge on the wall of disengaging section 13. The water and solids mixture runs down the wall of the disengaging section and collects in the surge tank 12 and the scrubbed gas exits through outlet 21. The anti-spin cone 19 and straightening vanes 20 are provided so that cyclonically flowing gas does not enter the exhaust fan as this would reduce the efficiency of operation of the exhaust fan.

The slurry collecting in the surge tank is periodically withdrawn through clean-out tap 15.

As a result of the design and construction of the gas scrubber, gas with most of the fine solids stripped out, leaves through the gas outlet at the top of the unit. The gas is scrubbed at four zones: (1) By the quench spray from water spray 45; (2) By impingement of the gas against the submerged scrubbing baffle; (3) By the high speed gas-liquid contact and aspiration in the upflow zone; and (4) By the scrubbing action of the entrained water during the cyclonic flow in the spin slots 41 and the disengaging section.

The varying water levels indicated in FIG. 1 result from the pressure differentials in various parts of the system. The pressure drop through the system can be adjusted by adjusting the height of overflow weir 14 to raise or lower the amount of water in the system. The scrubbing action effectively accomplished by the foregoing system is accomplished without the need for a pump for recycling the water to provide effective scrubbing action and without the need for a high rate of spray injection.

It will thus be seen that the objects set forth above, among those made apparent from the preceding description, are efficiently attained, and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. In a gas scrubber comprising a tank, a disengaging section rising vertically above the tank and communicating therewith, and a downflow section within the disengaging section, the combination including an upflow section surrounding the downflow section and a scrubbing baffle, said upflow section having a lower end terminating below the lower end of said downflow section, said scrubbing baffle being mounted within said upflow section with at least a portion of said scrubbing baffle located below said lower end of said downflow section, said upflow section having an upper end and means at said upper end defining at least one spin slot for delivering gas from said upflow section to said disengaging section.

2. A gas scrubber as claimed in claim 1, wherein said scrubbing baffle is substantially cone-shaped with the maximum cross-sectional dimension being less than the cross-sectional dimension of the upflow section and greater than the cross-sectional dimension of the downflow section at the lower end thereof.

3. A gas scrubber as claimed in claim 1, wherein said downflow section includes means defining a venturi throat proximate the lower end of said downflow section for accelerating gases travelling through said downflow section.

4. A gas scrubber as claimed in claim 1, wherein said tank includes a weir having an open end, the position of said open end in said tank determining the level of fluid in said tank.

5. A gas scrubber as claimed in claim 1, wherein said means defining said spin slot comprises an exterior wall of said downflow section, an interior wall of said upflow section and hood means cooperating between said interior and exterior walls for defining, with said walls, an exit opening for the exit of gas from said upflow section.

6. A gas scrubber as claimed in claim 5, wherein said exit opening is oriented to deliver gas therefrom in a direction tangential to the external surface of said downflow section.

7. A gas scrubber as claimed in claim 6, wherein said interior wall of said upflow section defining said spin slot is generally pie-shaped and said hood means includes an arcuate plate extending from the arcuate edge of said pie-shaped portion of said upflow section to said exterior wall of said downflow section.

* * * * *